United States Patent
Vlaar (10) Patent No.: US 11,137,105 B2
(45) Date of Patent: Oct. 5, 2021

(54) MONITOR ARM COUPLING UNIT FOR COUPLING A FLAT PANEL DISPLAY MONITOR TO AN END OF A MONITOR ARM OF A MONITOR ARM STAND, AND MONITOR ARM STAND INCLUDING SUCH A MONITOR COUPLING UNIT

(71) Applicant: Vlaar Innovations B.V., Midwoud (NL)

(72) Inventor: Erik Jacobus Vlaar, Midwoud (NL)

(73) Assignee: VLAAR INNOVATIONS B.V., Midwoud (NL)

( * ) Notice: Subject to any disclaimer, the term of this patent is extended or adjusted under 35 U.S.C. 154(b) by 0 days.

(21) Appl. No.: 16/309,847

(22) PCT Filed: Jun. 9, 2017

(86) PCT No.: PCT/NL2017/050379
§ 371 (c)(1),
(2) Date: Dec. 13, 2018

(87) PCT Pub. No.: WO2017/217840
PCT Pub. Date: Dec. 21, 2017

(65) Prior Publication Data
US 2019/0309893 A1   Oct. 10, 2019

(30) Foreign Application Priority Data
Jun. 13, 2016   (NL) ...................... 2016954

(51) Int. Cl.
*F16M 11/04*   (2006.01)
*F16M 11/08*   (2006.01)
(Continued)

(52) U.S. Cl.
CPC ......... *F16M 11/045* (2013.01); *F16M 11/046* (2013.01); *F16M 11/08* (2013.01);
(Continued)

(58) Field of Classification Search
CPC .... F16M 11/045; F16M 11/046; F16M 11/08; F16M 11/14; F16M 11/2014; F16M 2200/066
(Continued)

(56) References Cited

U.S. PATENT DOCUMENTS 6,554,238 B1 *  4/2003  Hibberd ............... A47B 81/061
                                                 248/278.1
7,028,961 B1 *  4/2006  Dittmer ................. F16M 11/04
                                                 248/278.1
(Continued)

FOREIGN PATENT DOCUMENTS

CN    205 118 590      3/2016
WO    WO 02/073085     9/2002

OTHER PUBLICATIONS

International Search Report from PCT/NL2017/050379 dated Sep. 11, 2017.

*Primary Examiner* — Christopher Garft
*Assistant Examiner* — Michael McDuffie
(74) *Attorney, Agent, or Firm* — Adsero IP (57) ABSTRACT

A monitor arm coupling unit (1) for coupling a flat panel display monitor to an end of a monitor arm (2) of a monitor arm stand (3), comprising a monitor coupling part having a back plate (5) that is provided with mounting provisions arranged in a mounting pattern that in use cooperates with corresponding mounting provisions (6) on the back of a flat panel display monitor. The back plate comprises a central portion and a peripheral edge spaced away therefrom, and a monitor arm coupling piece that is connected to the back plate via an adjustment mechanism (10). An end part of the monitor arm coupling piece is adjustable via the adjustment mechanism between a first position in which the end part of the monitor arm coupling piece is located away from a (Continued)

peripheral edge of the back plate, and a second position in which the end part is located closer to that peripheral edge of the back plate.

21 Claims, 9 Drawing Sheets (51) Int. Cl.
  *F16M 11/14* (2006.01)
  *F16M 11/20* (2006.01)
(52) U.S. Cl.
  CPC ......... *F16M 11/14* (2013.01); *F16M 11/2014* (2013.01); *F16M 2200/066* (2013.01)
(58) Field of Classification Search
  USPC ......... 248/176.3, 274.1, 276.1, 282.1, 283.1, 248/288.31, 289.11, 917–924
  See application file for complete search history.

(56) References Cited

U.S. PATENT DOCUMENTS

| | | | | |
|---|---|---|---|---|
| 7,694,927 B2* | 4/2010 | Chuang | ................ | F16M 11/041 248/276.1 |
| 7,922,132 B2* | 4/2011 | Saez | .................... | F16M 11/041 248/124.1 |
| 8,254,092 B2* | 8/2012 | Russell | ................. | F16M 11/08 248/125.7 |
| 8,282,052 B2* | 10/2012 | Huang | ................. | F16M 11/045 248/125.1 |
| 8,469,323 B1* | 6/2013 | Deros | ................. | F16M 11/105 248/123.11 |
| 8,602,366 B2* | 12/2013 | Chen | .................... | F16M 11/046 211/206 |
| 2004/0262474 A1* | 12/2004 | Boks | .................... | F16M 11/041 248/276.1 |
| 2005/0092873 A1 | 5/2005 | Lin | | |
| 2006/0065795 A1 | 3/2006 | Blackburn | | |
| 2007/0170321 A1* | 7/2007 | Smed | .................... | F16M 11/14 248/181.1 |
| 2007/0246633 A1 | 10/2007 | Carnevali | | |
| 2008/0265114 A1* | 10/2008 | Moscovitch | .............. | G06F 1/16 248/176.3 |
| 2009/0173847 A1* | 7/2009 | Dittmer | ................ | F16M 11/041 248/125.2 |
| 2010/0084527 A1* | 4/2010 | Lau | .................... | F16M 11/2014 248/217.4 |
| 2010/0213151 A1* | 8/2010 | Theesfeld | .............. | A47B 57/06 211/151 |
| 2011/0147546 A1* | 6/2011 | Monsalve | .......... | F16M 11/2014 248/122.1 |
| 2011/0150564 A1* | 6/2011 | Stefan | ................ | A61B 1/00149 403/136 |
| 2012/0037776 A1* | 2/2012 | Hung | .................... | F16M 11/08 248/282.1 |
| 2013/0078855 A1* | 3/2013 | Hornick | ................. | H01R 13/73 439/571 |
| 2014/0086666 A1* | 3/2014 | Grziwok | ................ | F16M 11/14 403/56 |
| 2014/0197289 A1* | 7/2014 | Chen | .................... | F16M 13/022 248/214 |
| 2014/0361134 A1* | 12/2014 | Chuang | .............. | F16M 11/2014 248/276.1 |
| 2015/0139635 A1* | 5/2015 | Lellky | ................. | G03B 17/561 396/427 |
| 2018/0109704 A1* | 4/2018 | Gilbert | .............. | F16M 11/2078 |
| 2018/0172065 A1* | 6/2018 | Stewart | .................. | F16M 13/02 |
| 2018/0292043 A1* | 10/2018 | Clark | .................... | F16M 11/14 |

\* cited by examiner

MONITOR ARM COUPLING UNIT FOR COUPLING A FLAT PANEL DISPLAY MONITOR TO AN END OF A MONITOR ARM OF A MONITOR ARM STAND, AND MONITOR ARM STAND INCLUDING SUCH A MONITOR COUPLING UNIT

RELATED APPLICATIONS

This application is a 35 U.S.C. § 371 national phase application of PCT/NL2017/050379 (WO/2017/217840), filed on Jun. 9, 2017, entitled "Monitor Arm Coupling Unit for Coupling a Flat Panel Display Monitor to an End of a Monitor Arm of a Monitor Arm Stand, and Monitor Arm Stand Including Such a Monitor Coupling Unit", which application claims priority to Netherlands Application No. 2016954, filed Jun. 13, 2016, which is incorporated herein by reference in its entirety.

The invention generally relates to monitor arm stands, and in particular to a monitor arm coupling unit for coupling a flat panel display monitor to an end of a monitor arm of a monitor arm stand. Monitor arm stands are well known, and are used to position flat panel display monitors at a work space, such as a desk, at a desired viewing position. Typically a monitor arm stand comprises a post that extends along a longitudinal axis, a monitor arm for supporting a monitor radially outward relative to the longitudinal axis of the post, and a monitor arm coupling piece with which the monitor arm in use is swivably coupled to the post at a set position of the longitudinal axis. Commonly, such monitor arm coupling piece is embodied as a plateau that includes machined clamping surfaces that are axially adjustable along the longitudinal axis of the column to a rotationally fixed, set height position, and that carries the monitor arm via a swivel bolt connection.

A first post may be embodied as a main column that is supported by the desk, and may include a mounting track so that, in addition to a swivel angle of the monitor arm, the position of the arm on the longitudinal axis of the post may be set to position the monitor at a desired height and depth relative to an edge of the desk. In basic work spaces where only a single monitor is provided, a monitor arm stand may be used to support only a single display monitor. However, in more complex work spaces, there can be desire to use a monitor arm stand to support a plurality of monitors, e.g. monitors for two desks, plural display monitors per desk in a single viewing plane, or even a bank of monitors.

Monitor arm stands may in practice be fairly complex in their configuration, and may e.g. be articulated in that two monitor arms are swivably connected via a common intermediate post, to increase the reach of the stand or to allow more monitors to be placed in a single viewing plane. Also, the monitor arm stand may have multiple monitor arms. A single post may thus be embodied as a main column that may carry two or more separate carrying arms, e.g. each serving a desk. The monitor arms may each carry a single monitor, but may also individually carry a plurality of monitors, e.g. via a bar. Also, the monitor arms may jointly carry a plurality of monitors, e.g. via a bar, depending on the configuration. In such configuration, two arms may serve the same desk.

Often, an existing monitor arm stand needs to be reconfigured, e.g. to carry a different number of monitors. After such reconfiguration, e.g. for ergonomic and/or aesthetic reasons, it is often desired that the monitors are aligned in height position, e.g. with their top edges, bottom edges or centers at the same height level. Typically, reconfiguration involves a relatively complex operation, requiring substitution of parts and/or the use of tools for (dis)assembly. For example, when a monitor arm stand is reconfigured from a single arm configuration to a single post dual arm configuration, to ensure that the monitors are carried at the same height in the new configuration, a plateau with a single swivel bolt connection that carries a single arm needs to be replaced by a plateau that carries dual swivel bolts.

The invention aims to alleviate at least some of the above disadvantages. In particular, the invention aims to provide a monitor arm stand that reduces the need for substitution of parts and/or that is relatively easy to reconfigure.

Thereto, the invention provides for a monitor arm coupling unit for coupling a flat panel display monitor to an end of a monitor arm of a monitor arm stand, comprising a monitor coupling part having a back plate that is provided with mounting provisions arranged in a mounting pattern that in use cooperates with corresponding mounting provisions on the back of a flat panel display monitor, which back plate comprises a central portion and a peripheral edge spaced away therefrom, and a monitor arm coupling piece that is connected to the back plate via an adjustment mechanism, in which an end part of the monitor arm coupling piece is adjustable via the adjustment mechanism between a first position in which the end part of the monitor arm coupling piece is located away from a peripheral edge of the back plate, and a second position in which the end part is located closer to that peripheral edge of the back plate. This way, the height position of a monitor carried on the monitor arm may be compensated relatively easily, without the need for substitution of parts and/or the need for using tools. In particular, the end part of the monitor arm coupling piece may e.g. be adjusted from a first position in which it is adjacent to one peripheral edge, to a second position in which is it adjacent to an opposite peripheral edge. Also, the end part of the monitor arm coupling piece may in the first position be located closer to a central portion of the back plate than in the second position.

The peripheral edge may be an edge portion, and may in particular be a horizontal top edge, or a horizontal bottom edge of the back plate.

The adjustment mechanism may be configured for rotationally adjusting the adjustment part relative to the base plate. The adjustment mechanism may offer one or more rotational degrees of freedom, e.g. a tilting movement to in use adjust a monitor about a transverse or horizontal axis of the monitor relative to its arm, a swivel movement to in use adjust a monitor about an upright or vertical axis of the monitor relative to its arm, and/or a rotating movement to in use adjust a monitor about a perpendicular axis of the monitor relative to its arm. Preferably, the adjustment mechanism may be configured to offer at least two such rotational degrees of freedom, e.g. tilt and one of rotate or swivel.

The mounting provisions may in particular be embodied as apertures or holes, and the mounting pattern may correspond to a mounting pattern arranged on the backside of a flat panel display monitor. The mounting pattern may in particular be arranged in a flat plane. A monitor arm coupling unit having such a mounting pattern may typically be referred to as a VESA mount, and the mounting pattern may e.g. be a standardized mounting pattern in accordance with the FDMI standard.

The adjustment mechanism may comprise a base part that is connected to the back plate, and an adjustment part that is mounted to the base part and that carries the monitor arm coupling piece. This allows for a relatively simple construction.

The base part may be mounted to the back plate eccentrically. In combination with a stroke of the end portion of the adjustment part that compensates the eccentricity, this allows the end portion to be placed centrally in the first position. Such compensating stroke may offer a relatively small or limited height adjustment, and in practice compensation of a full monitor arm coupling unit height may be required to align the height position of two monitors. The base part may also be mounted to the back plate centrally, and may be provided with a stroke of the end portion of the adjustment part that can be chosen freely. This allows for a relatively large or non-limited height adjustment.

The central portion of the back plate may correspond to a center point of the back plate and/or the mounting pattern. This allows the first position to correspond with the center. The second position may e.g. be chosen to be located as close as possible to the peripheral edge of the back plate. This maximizes adjustment distance within the space available for adjustment on the back plate.

The adjustment part may be reversible relative to a reversing axis that extends substantially transversely to the back plate. Such reversing axis may pass through the center point, or may pass at a distance spaced away from the center point. Such reversing axis may be a rotation axis of the adjustment part, e.g. in case of a rotatably connected adjustment part, so that the adjustment part need not be disconnected from the back plate for adjustment. The reversing axis may e.g. be a rotation axis of the adjustment mechanism. The adjustment part may as an alternative or in addition be detachable, so that upon adjustment it may e.g. be detached, flipped about the reversing axis, and be reattached. The adjustment part may alternatively be adjustable along an adjustment track, e.g. a linear adjustment track.

The adjustment part may be positioned on a first axis of symmetry of the mounting pattern of the back plate in both the first and second position, e.g. on an axis of symmetry that in use on the monitor arm stand extends substantially upright.

The adjustment part may in the second position be spaced away from a second axis of symmetry of the mounting pattern of the back plate, and may in the first position be located on the second axis of symmetry of the mounting pattern, e.g. an axis of symmetry that in use on the monitor arm stand extends substantially level or horizontally. The center point may coincide with the intersection of the first and second axes of symmetry.

The monitor arm coupling piece may in its first position be directed with its end part extending away from the reversing axis towards the center point. In the second position it may be directed with its end part extending away from its reversing axis towards the peripheral edge.

The base part and the adjustment part may be embodied as cooperating ball joint parts. This allows the back plate to tilt, rotate and swivel relative to the monitor arm coupling piece, and allows for reliable transfer of the weight forces of a monitor attached to the back plate. In use, the back plate of the monitor arm coupling unit may typically be coupled to the back of a flat panel display monitor through mounting provisions of the mounting pattern of the back plate that cooperates with corresponding mounting provisions on the back of the monitor. The adjustment part may therefore be provided with a coupling, in particular a linear insertion coupling. The provision of a coupling allows the monitor arm coupling unit to be coupled to an end of a monitor arm of a monitor arm stand relatively easily via a corresponding coupling part provided on the end of the monitor arm. A linear insertion coupling allows the monitor coupling part to be coupled in a linear coupling movement, with its coupling axis arranged substantially transversely to the back plate, and typically allows a monitor to be switched out from an array of monitors in the same plane without need to displace nearby monitors.

The base part may be positioned eccentrically from the center point at a distance ½e in particular with its reversing axis. The adjustment part may then be reversibly mounted in the base part between a first position in which the end part of the monitor arm coupling piece is aligned with the central portion, and a second position in which the end part is spaced away from the central portion with a distance 2*½e.

The invention further relates to a monitor arm stand, comprising a post that extends along a longitudinal axis, a monitor arm for supporting a monitor radially outward relative to the longitudinal axis of the post, and a first monitor arm coupling piece with which the monitor arm in use is swivably connected to the post at a set position on the longitudinal axis, further comprising a further monitor arm coupling piece that is connected to a free end of the monitor arm that in use cooperates with a monitor arm coupling unit.

The distance e mentioned above may correspond to half of the height h of the first monitor arm coupling piece along the longitudinal axis of the post. This way, when a monitor arm stand is reconfigured from a single arm configuration to a single post dual arm configuration, the first monitor arm may then stay in place, and a second monitor arm may be positioned above it. To ensure that the monitors are carried at the same height in the new configuration, the end parts of the further monitor arm coupling pieces are each set via the adjustment mechanism to the second position, and facing away from each other. The end parts of the monitor arm coupling units are then each offset from the center with a distance e. The total adjustment 2e equals the height h of the first monitor arm coupling piece of the added monitor arm.

In case the monitor arm coupling unit of the first monitor arm faces upward in the second position, the further monitor arm coupling piece may be uncoupled via its coupling and may be reversed. This way, the height position of a monitor carried on the monitor arm may be compensated relatively easily, without the need for using tools.

The post may thus include two monitor arms that are each positioned with their first monitor arm coupling piece adjacently above each other on the post, and in which the monitor arms each carry a monitor arm coupling unit at their free end of which the adjustment part is set in the second position, and in which the adjustment parts are facing away from each other, i.e. the bottom adjustment part facing downward, and the top adjustment part facing upward.

The invention further relates to a method of assembling a monitor arm stand, wherein two monitor arms are coupled with their first monitor arm coupling pieces adjacently above each other onto a post, and wherein each monitor arm on a free end is provided with a monitor arm coupling unit to carry a monitor, and wherein end parts of further monitor arm coupling pieces that are adjustable via an adjustment mechanism between a first position in which the end part of the monitor arm coupling piece is located away from a peripheral edge of the back plate, and a second position in which the end part is located closer to that peripheral edge of the back plate, are set in the second position, and wherein adjustment parts of the monitor arm coupling pieces are facing away from each other, the bottom adjustment part facing downward, and the top adjustment part facing upward (as seen from the respective back plates towards the arms).

It should be noted that the technical features described above may each on its own be embodied in a monitor arm coupling unit or monitor arm stand, i.e. isolated from the context in which it is described here, separate from other features or in combination with only a number of features described in the context in which it is disclosed herein. Each of these features may further be combined with any other feature disclosed, in any combination.

The invention will be further elucidated on the basis of non-limitative exemplary embodiments represented in the drawings. In the drawings:

FIG. 2b shows a schematic rear view of the monitor arm coupling unit of FIG. 2a;

FIG. 3b1 shows a schematic rear view of the monitor arm coupling unit of the top arm of FIG. 3a;

FIG. 3b2 shows a schematic rear view of the monitor arm coupling unit of the bottom arm of FIG. 3a;

FIG. 3c1 shows a schematic side view of the monitor arm coupling unit of FIG. 3b1; and FIG. 3c2 shows a schematic side view of the monitor arm coupling unit of FIG. 3b2.

FIG. 5b shows a schematic rear view of the monitor arm coupling unit of FIG. 5a;

It should be noted that the figures are merely schematic representations of preferred embodiments of invention. In the figures, identical or corresponding parts are represented with the same reference numerals.

Referring to FIG. 1, FIG. 2a, FIG. 2b and FIG. 2c a monitor arm coupling unit 1 for coupling a flat panel display monitor to an end of a monitor arm 2 of a monitor arm stand 3 is shown. The monitor arm coupling unit 1 comprises a monitor coupling part 4 having a back plate 5 that is provided with mounting provisions 6 arranged in a mounting pattern that in use cooperates with corresponding mounting provisions on the back of a flat panel display monitor. In use, the back plate 5 is coupled to the back of a flat panel display. The mounting provisions 6 are here embodied as bolt or screw holes, but may e.g. also be embodied as mounting pins or clamps. In use bolts or screws passing through the mounting pattern of the back plate may cooperate with corresponding mounting provisions, typically threaded inserts, on the back of the monitor.

Figure 2A:
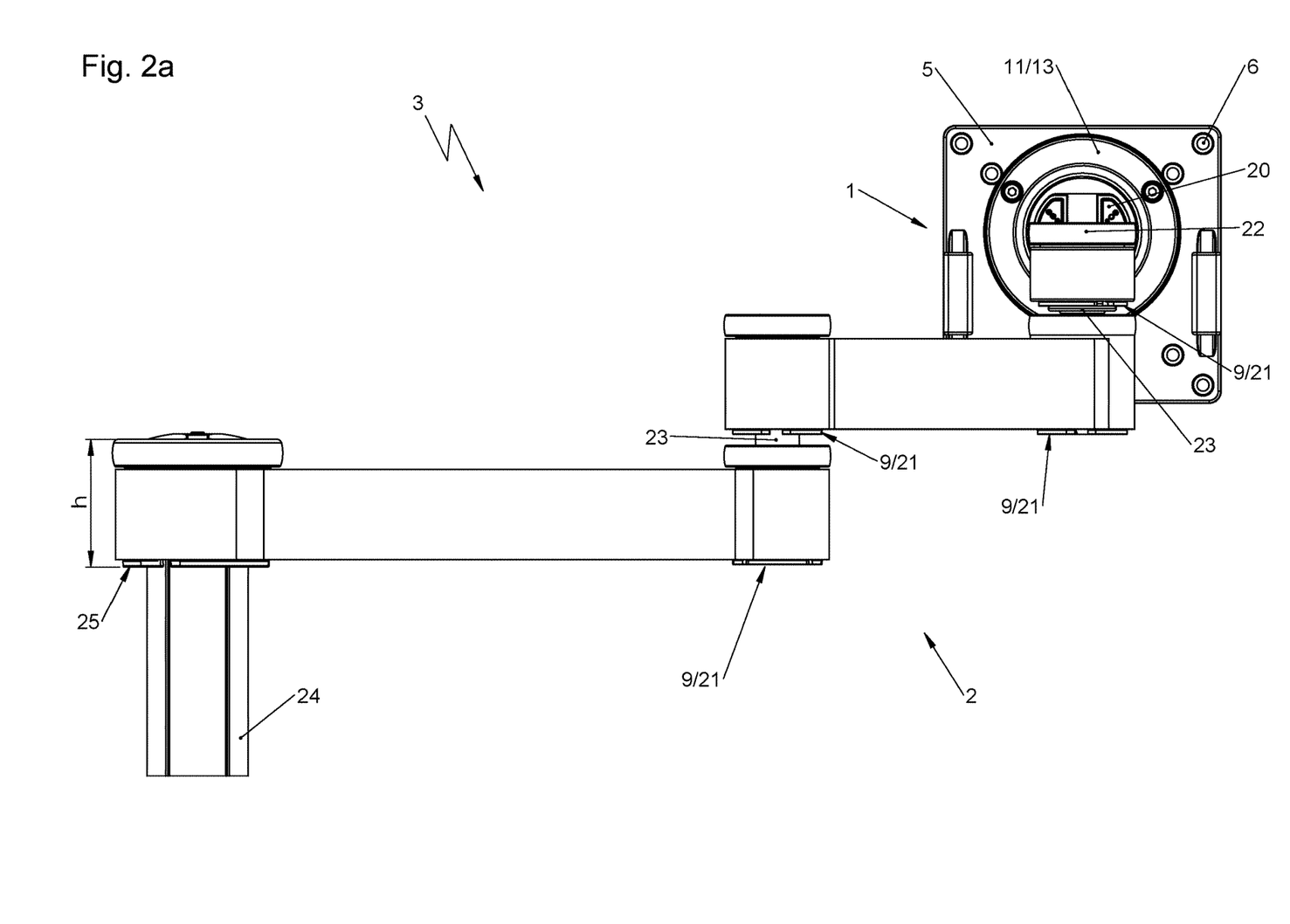
FIG. 2a shows a schematic rear view of a monitor arm stand including a single post carrying a single monitor arm carrying a single monitor arm coupling unit in accordance with FIG. 1.
Figure 2B:
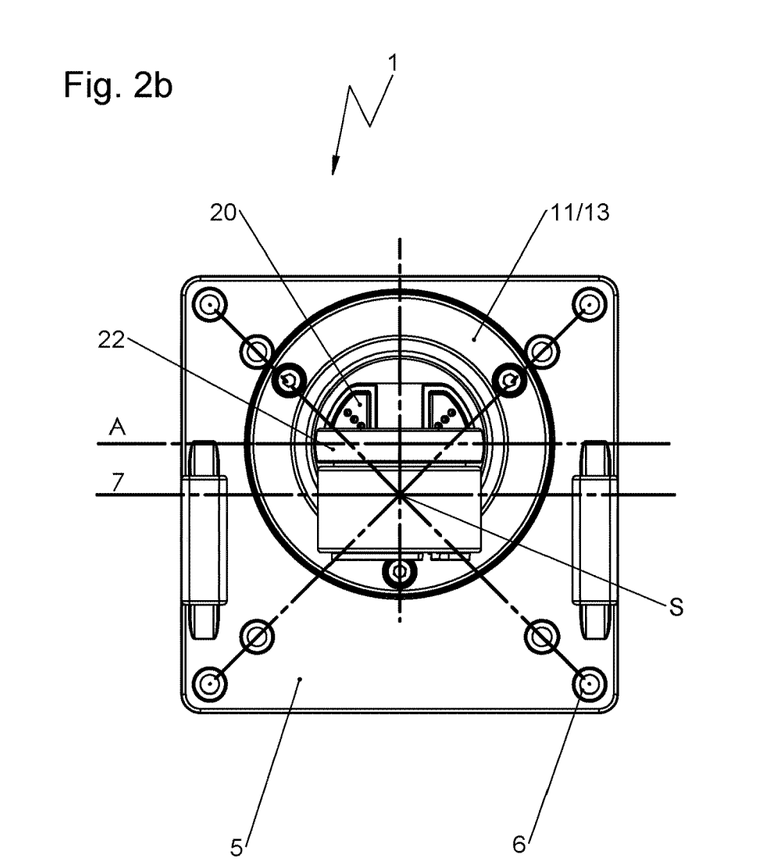
Figure 2C:
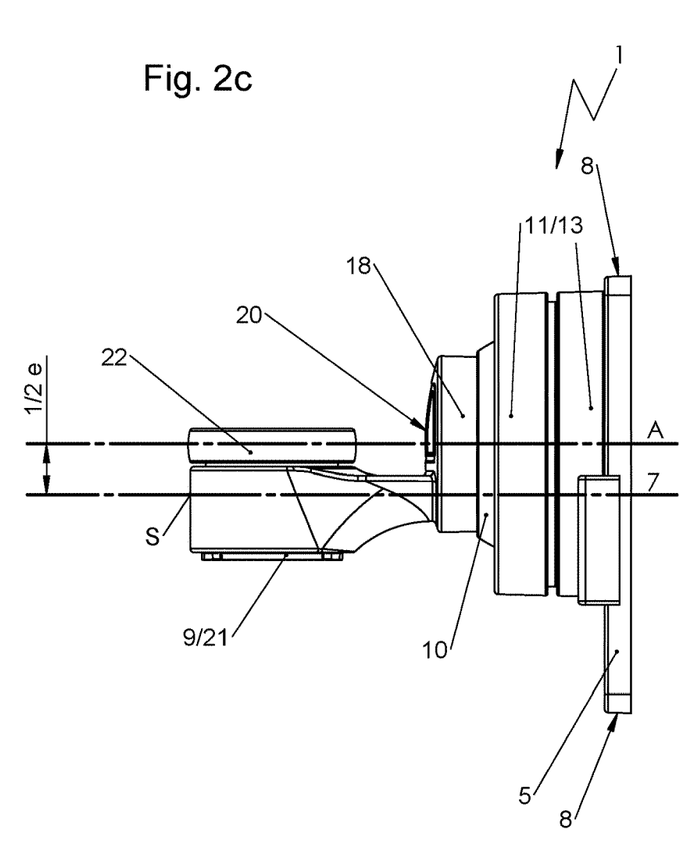
FIG. 2c shows a schematic side view of the monitor arm coupling unit of FIG. 2b.

The back plate 5 comprises a central portion 7 and a peripheral edge 8 spaced away therefrom. The back plate 5 further comprises a monitor arm coupling piece 9 that is connected to the back plate 5 via an adjustment mechanism 10. An end part of the monitor arm coupling piece 9 is adjustable via the adjustment mechanism 10 between a first position and a second position. The end part of the monitor arm coupling piece 9 is provided with a reference point S. Reference point S corresponds to a reversing axis of the adjustment part 12/of the end part of the monitor arm coupling piece 9. Reference point S is spaced away from reversing axis A of the base part 11/of the adjustment mechanism 10 by a distance ½e. As depicted in FIG. 2, in the first position, the end part of the monitor arm coupling piece 9, is located with its reference point S at the center point of the central portion 7 of the back plate 5. In the second position, which is shown in FIG. 3, the end part is located with its reference point S closer to the peripheral edge portion 8 of the back plate 5. The monitor arm coupling piece 9 is in its first position as shown in FIG. 2 directed with its end part extending away from the reversing axis A towards the center point. In the second position shown in FIG. 3, it is directed with its end part extending away from its reversing axis A towards the peripheral edge 8.

Figure 1:
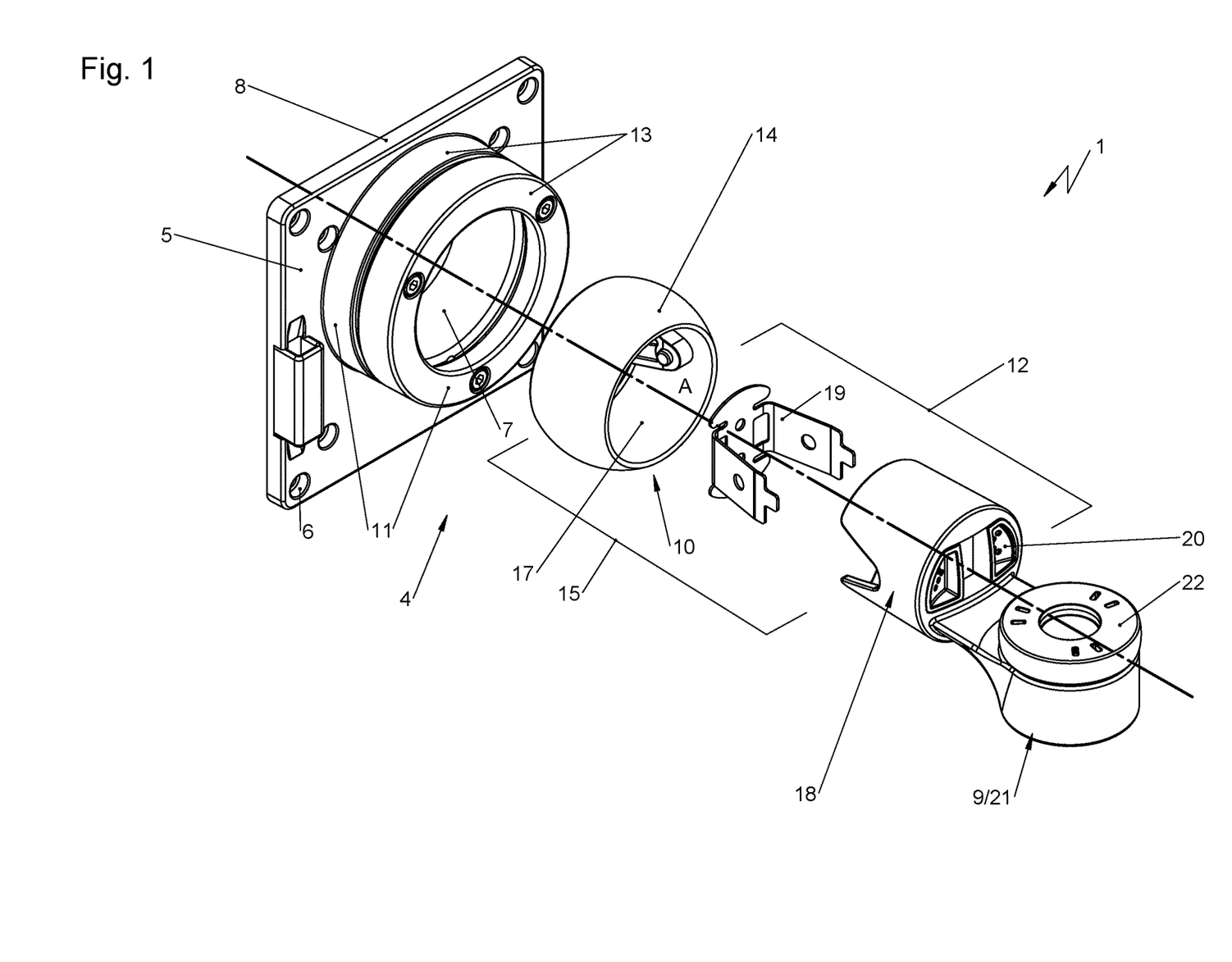
FIG. 1 shows a schematic exploded view of a monitor arm coupling unit.

The adjustment mechanism 10 comprises a base part 11 that is connected to the back plate 5, and an adjustment part 12 that is mounted to the base part 11 and that carries the monitor arm coupling piece 9. The base part 11 is mounted to the back plate 5 eccentrically. The center point of the back plate 5 is in this embodiment also the center point of the mounting pattern. The base part 11 is positioned eccentrically from the center point at a distance ½e.

The adjustment part 12 is reversible relative to a reversing axis A that extends substantially transversely to the back plate 5, and that is spaced away from the center point. In this embodiment, the reversing axis A is a rotation axis of the adjustment part 12.

In this embodiment, the adjustment part 12—and in fact the adjustment mechanism 10—is positioned on a first axis of symmetry of the mounting pattern of the back plate 5 in both the first and second position, formed by a vertical axis of the back plate 5. The adjustment part 12 is in the second position spaced away from a second axis of symmetry of the mounting pattern of the back plate, formed by a horizontal axis of the back plate. The adjustment part 12 is in the first position located on the second axis of symmetry of the mounting pattern.

The base part 11 and the adjustment part 12 are embodied as cooperating ball joint parts and together form an adjustment mechanism 10 for adjusting the position of a monitor carried on the back plate 5 relative to the arm about three rotational degrees of freedom corresponding to tilt, rotate and swivel. The base part 11 comprises two ring segments 13 that have inner surfaces embodied as sphere sections. The ring segments 13 are being mounted together using screws to hold a ball 14 there between with friction, so that in use the back plate 5 may swivel and tilt. The adjustment mechanism 10 is configured for rotationally adjusting the adjustment part 12 relative to the base plate 5. The adjustment mechanism 10 is further configured to offer three rotational degrees of freedom, a tilting movement to in use adjust a monitor about a transverse or horizontal axis of the monitor relative to its arm, a swivel movement to in use adjust a monitor about an upright or vertical axis of the monitor relative to its arm, and/or a rotating movement to in use adjust a monitor about a perpendicular axis of the monitor relative to its arm.

The adjustment part 12 is provided with a linear insertion coupling 15, which allows the monitor arm coupling unit 1 to be coupled to the end of the monitor arm 2 of the monitor arm stand 3 relatively easily via a corresponding coupling part provided on the end of the monitor arm 2. The linear insertion coupling allows the monitor arm coupling unit 1 to be coupled in a linear coupling movement, with its coupling axis arranged substantially transversely to the back plate 5. In this embodiment, the linear insertion coupling 15 is embodied as a female mounting aperture 17 having a cylindrical base shape, that is adapted to receive a cylindrical male insertion coupling part 18. The insertion coupling parts 17 and 18 are provided with v-shaped alignment grooves and apertures. Within the alignment groove on the male insertion coupling part 18, a leaf spring 19 is mounted that is provided with apertures that catch on studs provided in the female insertion coupling part 17. A release 20 is provided on the male insertion coupling part 18 that acts on the leaf spring 19 to uncouple the studs when actuated. The cylindrical male insertion coupling part 18 carries a monitor arm coupling piece 9 that is embodied as a clamping bushing 21 via a post 23. The clamping bushing 21 may be operated using a crew ring 22 between a clamping operating position in which it may clamp onto a post 23 carried on a free end of the monitor arm 2, and a releasing position in which it leaves the post 23 free.

Referring in particular to FIG. 2a, a monitor arm stand 3 is shown. The monitor arm stand 3 comprises a post 24 embodied as a pillar that extends along a longitudinal axis, a monitor arm 2 for supporting a monitor radially outward relative to the longitudinal axis of the pillar post 24, and a first monitor arm coupling piece 25 with which the monitor arm 2 in use is swivably connected to the pillar post 24 at a set position on the longitudinal axis. The distance e corresponds to half of the height h of the first monitor arm coupling piece 25 along the longitudinal axis of the pillar post 24. A further post 23 carried on the free end of the monitor arm 2 is clampingly engaged by the clamping bushing 21 of the further monitor arm coupling piece carried on the cylindrical male insertion coupling part 18.

Referring to FIG. 3 the pillar post 24 includes two monitor arms 2 that are positioned with their first monitor arm coupling pieces adjacently above each other on the pillar post 24, and in which the monitor arms 2 each carry a monitor arm coupling unit 1 at their free end of which the adjustment part 12 is set in the second position, and in which the adjustment parts 12 are facing away from each other.

Figure 3A:
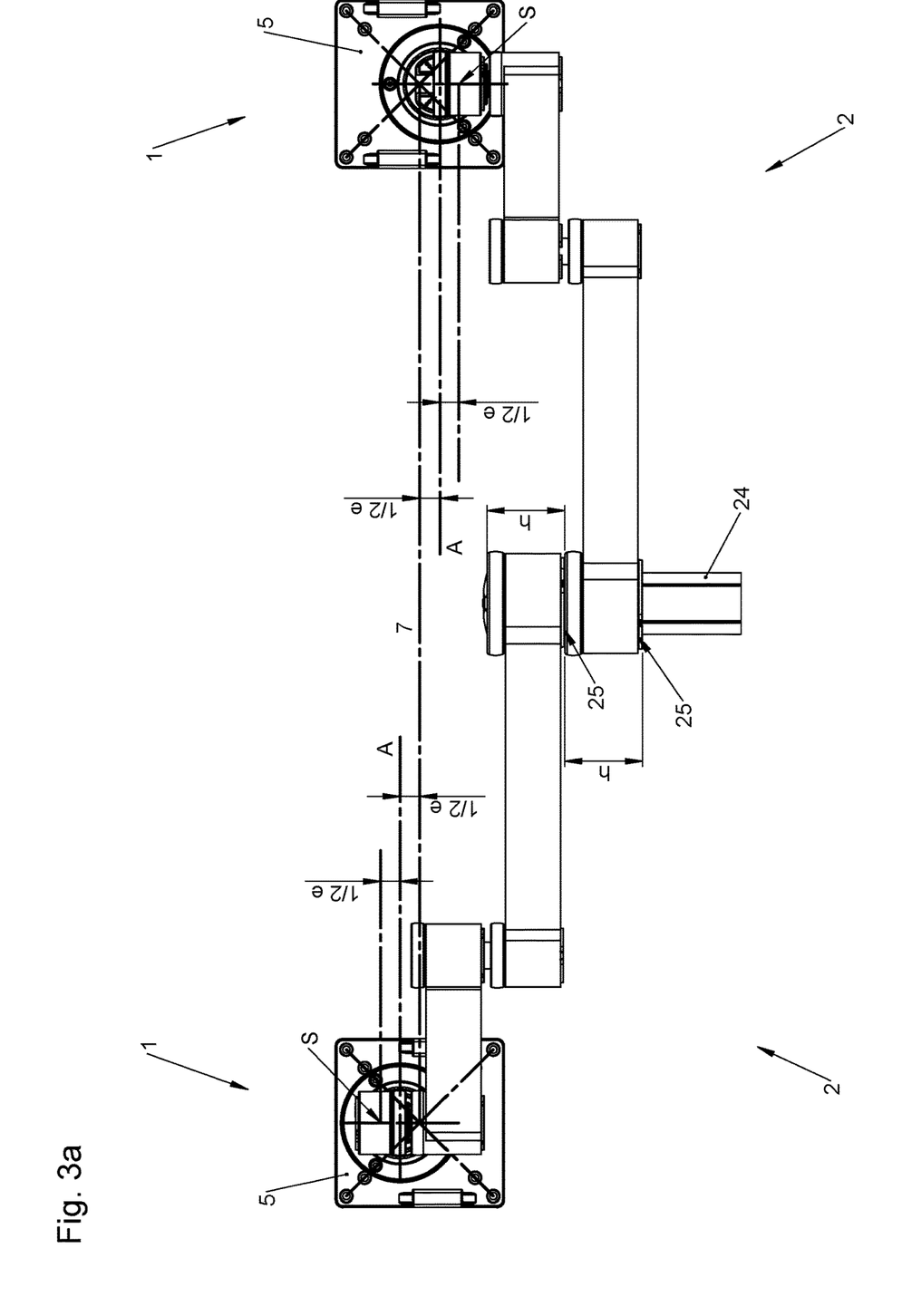
FIG. 3a shows a schematic rear view of the monitor arm stand of FIG. 2a reconfigured to include two single monitor arms that each carry a single monitor arm coupling unit.
Figure 3B:
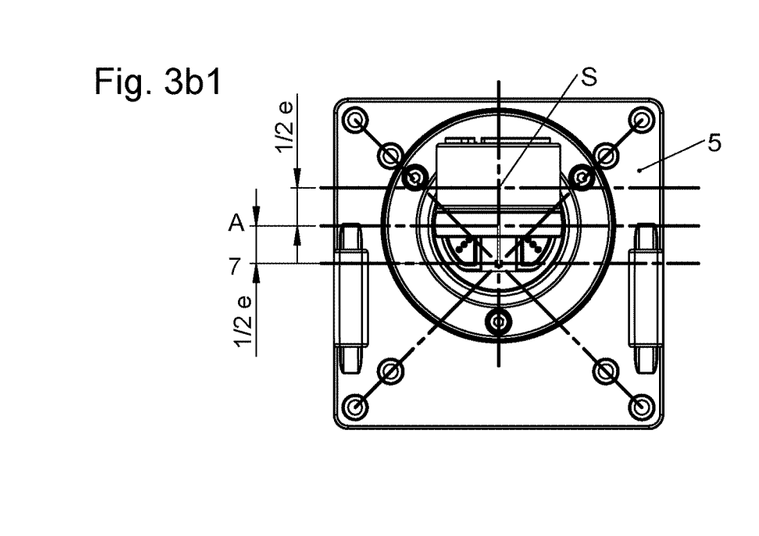
Figure 3B:
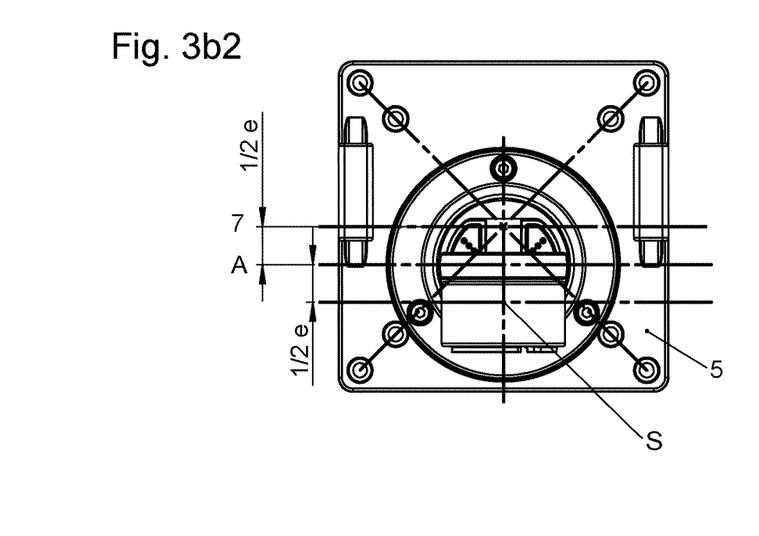

When the monitor arm stand of FIG. 2a is reconfigured from its single arm configuration to a single post dual arm configuration as shown in FIG. 3a, the first monitor arm 2 can stay in place, and a second monitor arm 2 is being positioned above it. To ensure that the monitors are carried at the same height in the new configuration, the end parts of the monitor arm coupling units 1, e.g. with their reference points S, are each set via the adjustment part 12 to the second position, and facing away from each other. The end parts of the monitor arm coupling units 1, e.g. with their reference points S, are then each offset from the central portion with a distance e. The total adjustment 2e equals the height h of the first monitor arm coupling piece 25 of the added monitor arm. For example, the height h may be about 50 mm so as to allow the height compensation to be generated within a VESA standard FDMI interface including a mounting pattern having mounting apertures placed on four corners of an outer square having a side of about 100 mm, concentrically arranged with the central portion of the back plate.

Figure 3C:
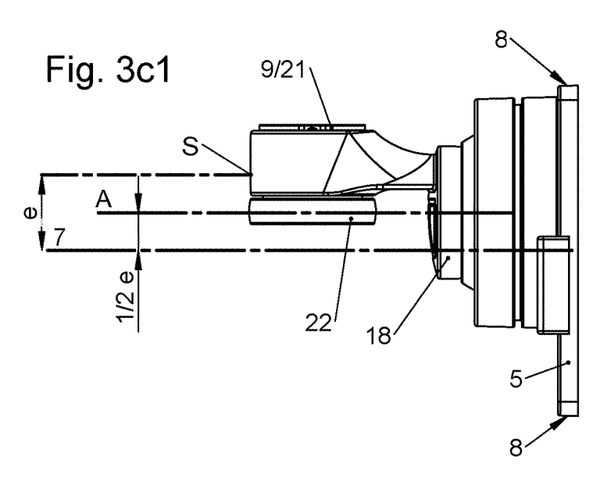
Figure 3C:
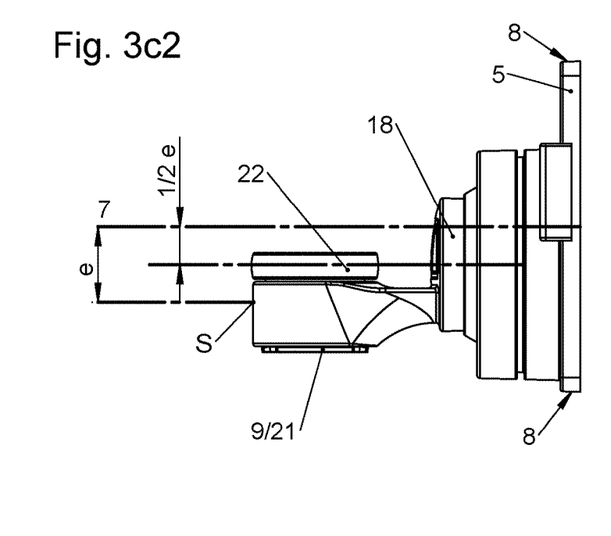

As shown, the reconfigured monitor arm 3 stand has a pillar post 24 that includes two monitor arms 2 that are positioned with their first monitor arm coupling pieces 25 adjacently above each other on the pillar post 24. The monitor arms 2 each carry a monitor arm coupling unit 1 at their free end of which the adjustment part 12 is set in the second position. The adjustment parts 12 are facing away from each other, i.e. the bottom adjustment part 12 facing downward, and the top adjustment part 12 facing upward. The peripheral edge portion 8 to which the adjustment part 12 is closer in FIG. 3c1 is a horizontal top edge, and in FIG. 3c2 is a horizontal bottom edge. The center points of the back plates are located at equal height, and the monitors carried thereon may thus be positioned with their centers at the same height above the desk.

In the first embodiment, the base part 11 has been mounted to the back plate 5 eccentrically. A stroke of the end portion 12 in the adjustment mechanism 10 compensates the eccentricity, so that the reference point S of the end portion 12 is located at the center point in the first position. As set out above, compensation of a full monitor arm coupling unit height is required to align the height position of two monitors.

Figure 4:
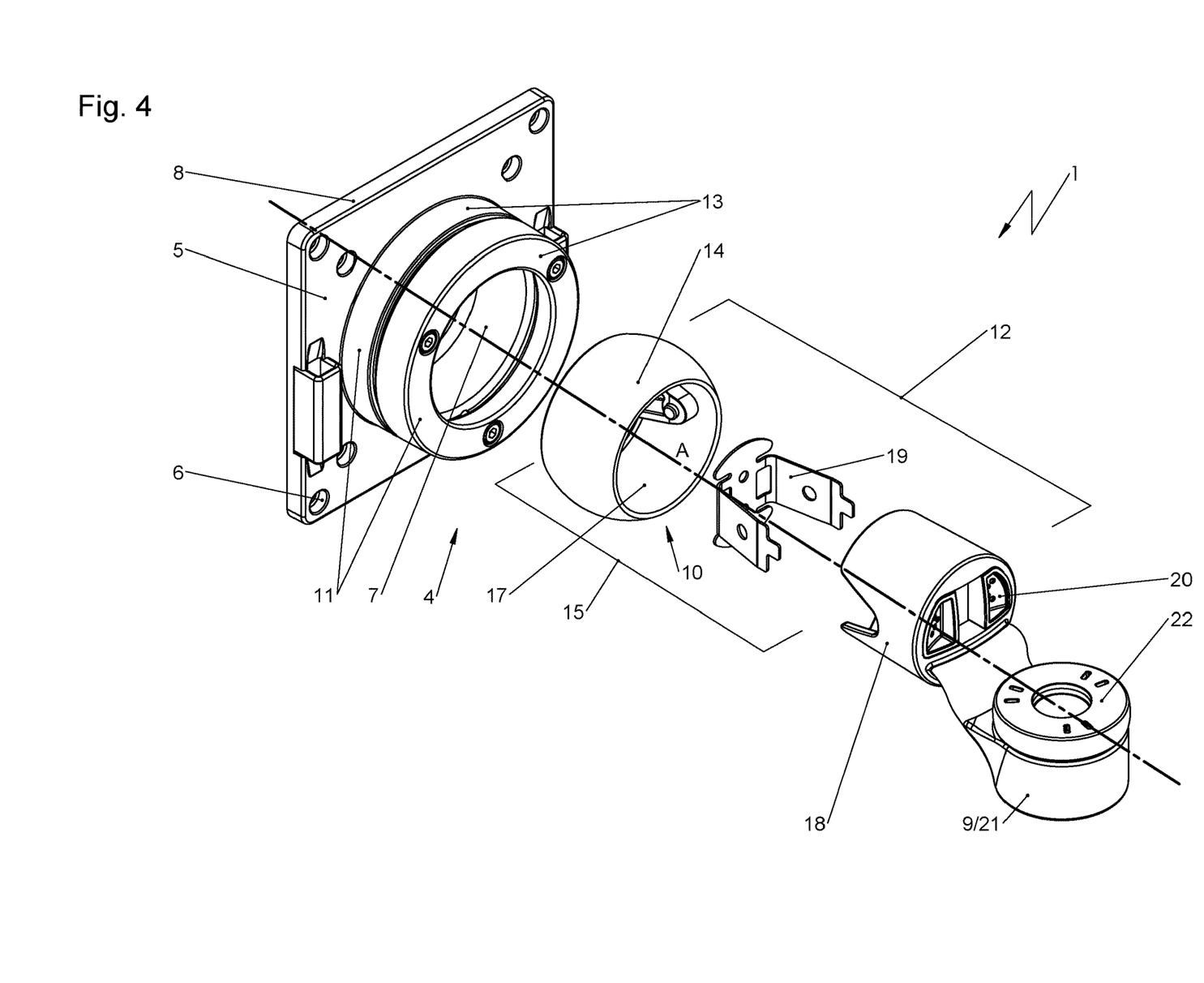
FIG. 4 shows a schematic exploded view of a second embodiment of a monitor arm coupling unit.
Figure 5A:
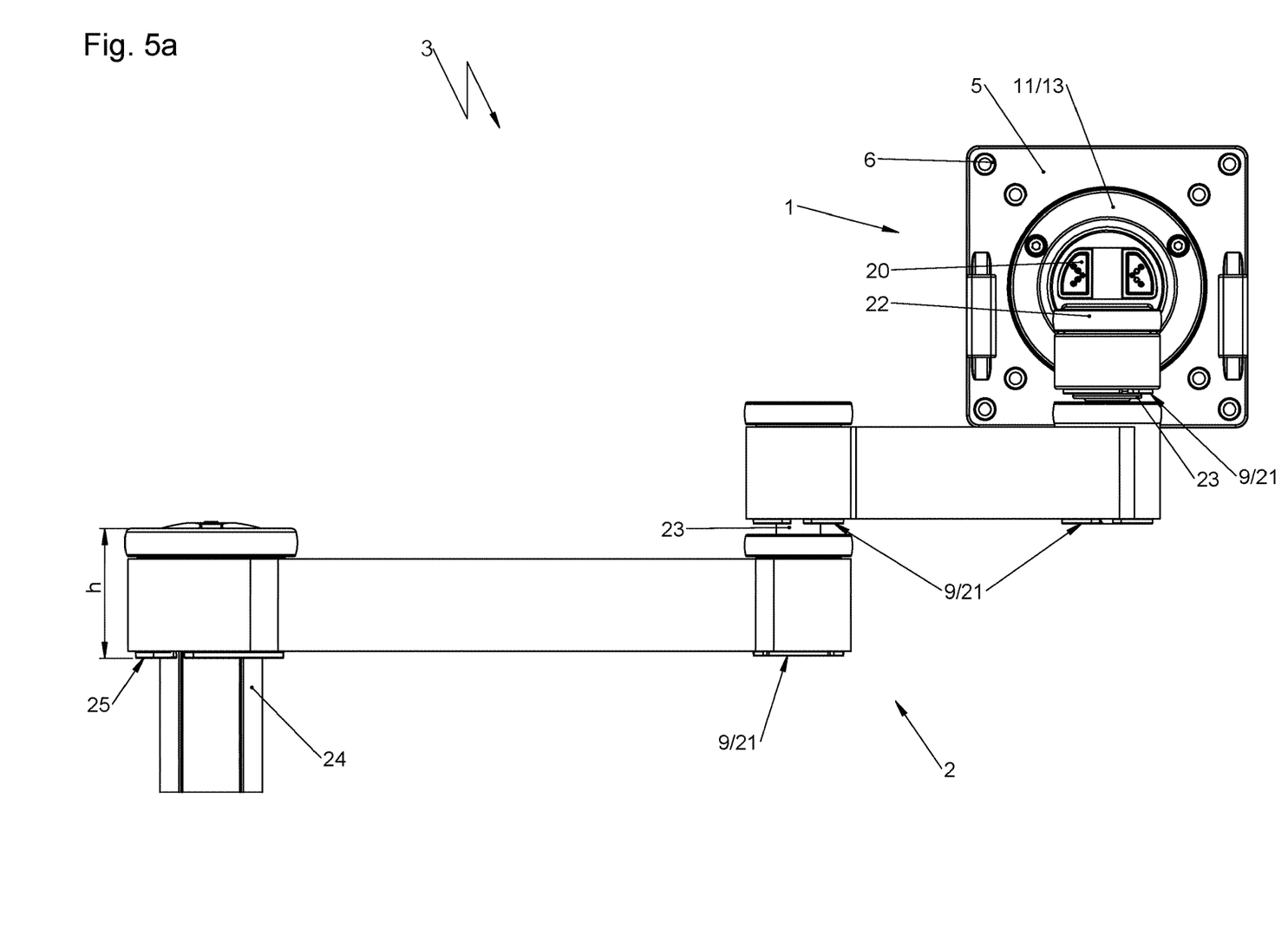
FIG. 5a shows a schematic rear view of a second embodiment of a monitor arm stand including a single post carrying a single monitor arm carrying a single monitor arm coupling unit in accordance with FIG. 4.
Figure 5B:
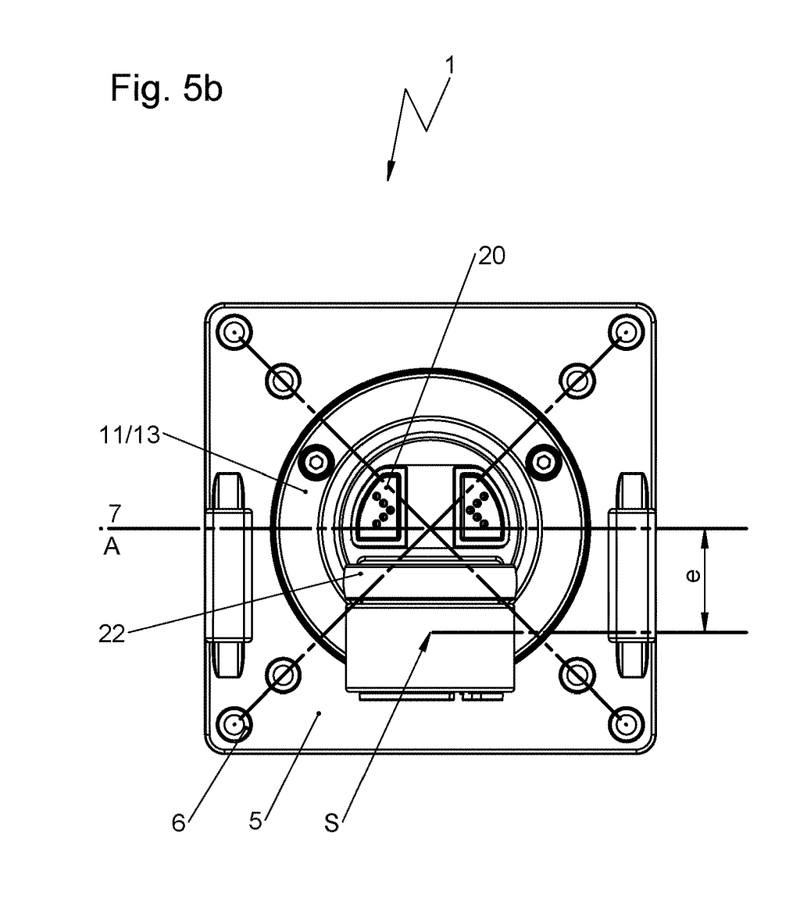
Figure 5C:
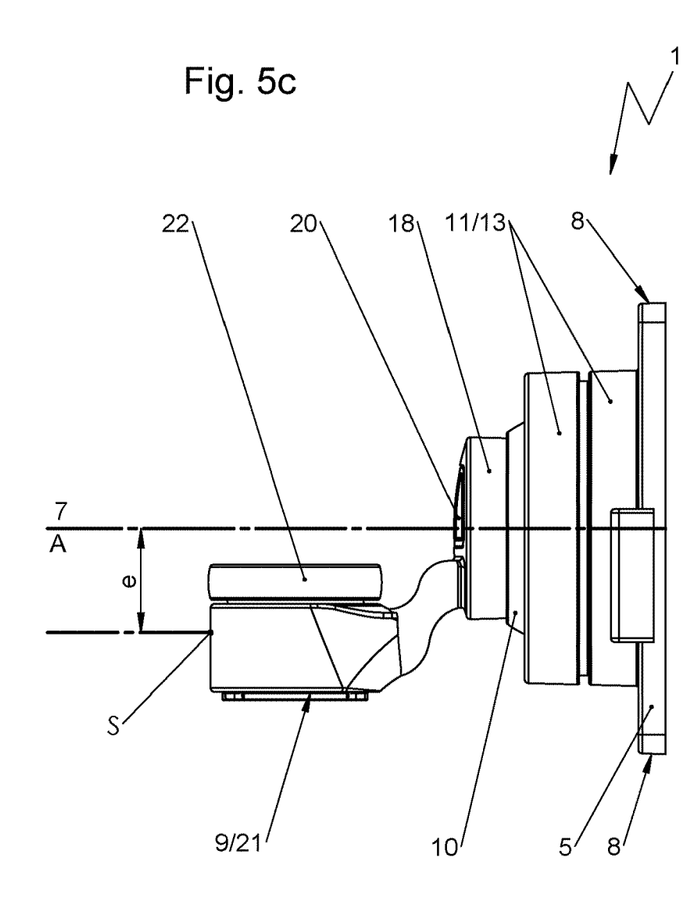
FIG. 5c shows a schematic side view of the monitor arm coupling unit of FIG. 5b.
Figure 6:
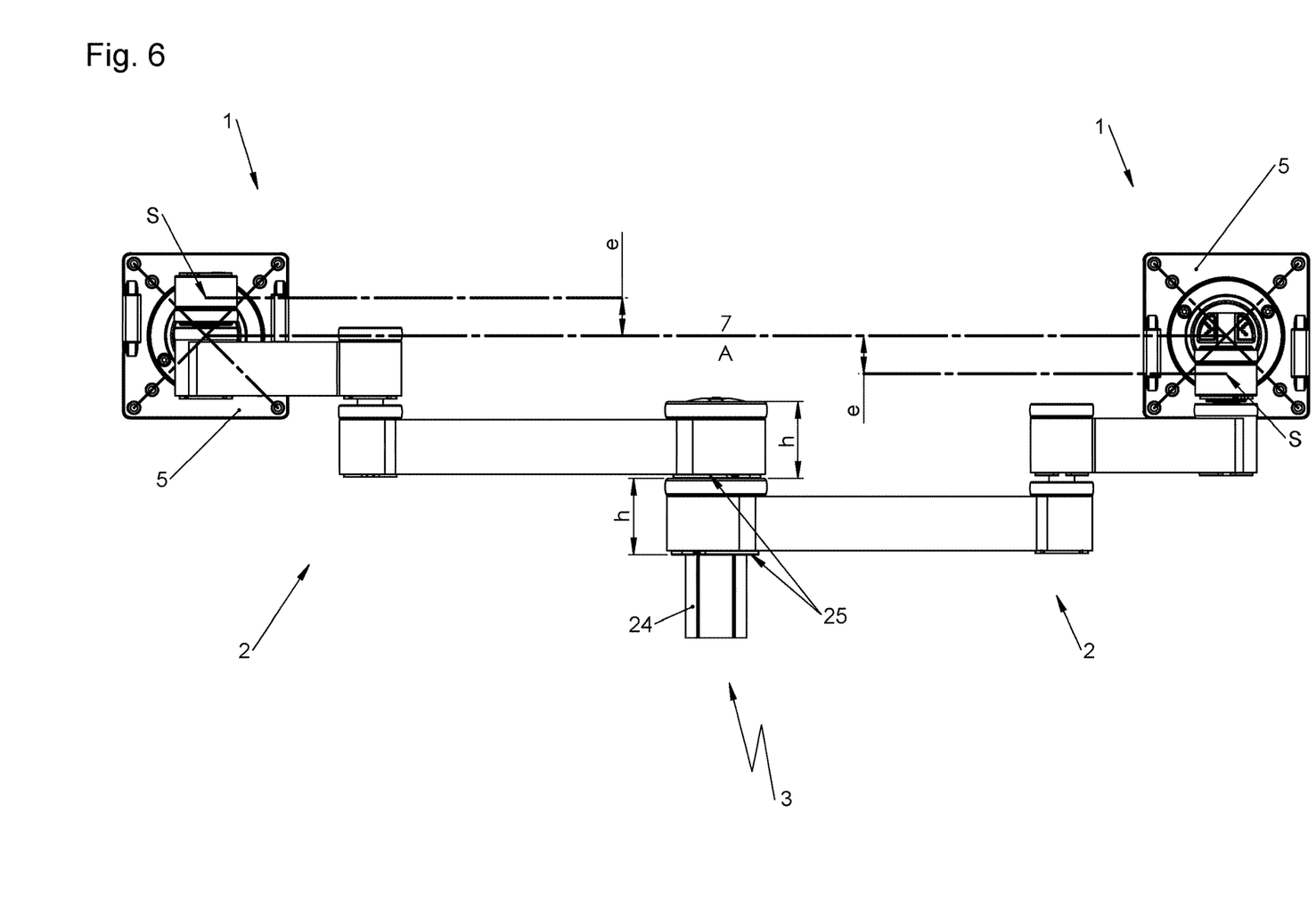
FIG. 6 shows a schematic rear view of the monitor arm stand of FIG. 5a reconfigured to include two single monitor arms that each carry a single monitor arm coupling unit.

In a second embodiment, shown in FIGS. 4-6, the base part 11 is mounted to the back plate 5 centrally, and may be provided with a stroke of the end portion of the adjustment part 12 that can be chosen freely. This allows for a relatively large or non-limited height adjustment. In this second embodiment, the end part 12 of the monitor arm coupling piece 9 is adjustable via the adjustment mechanism 10 between a first position in which the reference point S of the end part 12 of the monitor arm coupling piece 9 is located away from a peripheral edge portion 8 of the back plate 5, and a second position in which the end part is located closer to that peripheral edge portion 8 of the back plate 5. The end part 12 can in this embodiment be adjusted from a first position in which it is adjacent to one peripheral edge, to a second position in which it is adjacent to an opposite peripheral edge. The adjustment part 12 is in this embodiment via the adjustment mechanism 10 reversibly mounted in the base part 11 with a stroke of e in the height direction. The distance e is chosen to correspond to half of the height h of the first monitor arm coupling piece 9 along the longitudinal axis of the post 24. To ensure that the monitors are carried at the same height when the monitor arm stand 3 is reconfigured from a single arm configuration as shown in FIG. 5a to a double arm configuration shown in FIG. 6, in the double arm configuration of FIG. 6 the end parts 12 of the monitor arm coupling pieces 9 are each set via the adjustment mechanism 10 to the second position, and are carried on their respective monitor arms 2 facing away from each other. This way, the end parts 12 of the monitor arm coupling units 1 are then each offset from the center with a distance e, and the total adjustment 2e equals the height h of the first monitor arm coupling piece 9 of the added monitor arm 2.

The invention is not limited to the exemplary embodiment represented here, but includes variations. Such variations shall be clear to the skilled person and are considered to fall within the scope of the invention as defined in the appended claims.

LIST OF REFERENCE SIGNS 1. monitor arm coupling unit
2. monitor arm
3. monitor arm stand 4. monitor coupling part
5. back plate
6. mounting provisions
7. central portion
8. peripheral edge
9. monitor arm coupling piece
10. adjustment mechanism
11. base part
12. adjustment part
13. ring segments
14. ball
15. linear insertion coupling
17. female insertion coupling part, female mounting aperture
18. male insertion coupling part
19. leaf spring
20. release
21. clamping bushing
22. screw ring
23. post
24. pillar post
25. first monitor arm coupling piece
A. base part reversing axis/adjustment mechanism reversing axis
S. reference point corresponding to reversing axis of adjustment part/of end part of monitor arm coupling piece

The invention claimed is:

1. A monitor arm coupling unit for coupling a flat panel display monitor to an end of a monitor arm of a monitor arm stand, comprising a monitor coupling part having a back plate that is provided with mounting provisions arranged in a mounting pattern that in use cooperates with corresponding mounting provisions on the back of a flat panel display monitor, which back plate comprises a central portion and a peripheral edge spaced away therefrom, and a monitor arm coupling piece that is connected to the back plate via an adjustment mechanism, which adjustment mechanism is reversible relative to a first reversing axis that extends substantially transversely to the back plate, in which an end part of the monitor arm coupling piece comprises a second reversing axis that extends substantially transversely through an attachment coupling the monitor arm coupling piece to the adjustment mechanism to the back plate, in which the end part of the monitor arm coupling piece is reversible relative to the second reversing axis and is adjustable via the adjustment mechanism about the first reversing axis between a first connected position in which the second reversing axis of the end part of the monitor arm coupling piece is located away from a peripheral edge portion of the back plate, and a second connected position in which the second reversing axis of the end part of the monitor arm coupling piece is located closer to that peripheral edge portion of the back plate, wherein the second reversing axis is offset from and not the same axis as the first reversing axis.

2. The monitor arm coupling unit of claim 1, in which the end part of the monitor arm coupling piece is in the first connected position located closer to a central portion of the back plate than in the second connected position.

3. The monitor arm coupling unit according to claim 1, in which the adjustment mechanism comprises a base part that is connected to the back plate, and an adjustment part that is mounted to the base part and that carries the monitor arm coupling piece.

4. The monitor arm coupling unit according to claim 3, in which the base part is mounted to the back plate eccentrically.

5. The monitor arm coupling unit according to claim 4, in which the central portion of the back plate corresponds to a center point of the back plate and/or the mounting pattern.

6. The monitor arm coupling unit according to claim 5, in which the first reversing axis is spaced away from the center point.

7. The monitor arm coupling unit according to claim 6, in which the first reversing axis is a rotation axis of the adjustment part.

8. The monitor arm coupling unit according to claim 3, in which the adjustment part is positioned on a first axis of symmetry of the mounting pattern of the back plate in both the first and second position.

9. The monitor arm coupling unit according to claim 8, in which the adjustment part is in the second connected position spaced away from a second axis of symmetry of the mounting pattern of the back plate, and in the first connected position is located on the second axis of symmetry of the mounting pattern.

10. The monitor arm coupling unit according to claim 6, in which the monitor arm coupling piece is in its first connected position directed with its end part extending away from the first reversing axis towards the central portion, and in which the monitor arm coupling piece in the second connected position is directed with its end part extending away from the first reversing axis towards the peripheral edge.

11. The monitor arm coupling unit according to claim 1, in which the base part and the adjustment part are embodied as cooperating ball joint parts.

12. The monitor arm coupling unit according to claim 1, in which the adjustment part is provided with a linear insertion coupling.

13. The monitor arm coupling unit according to claim 3, in which the back plate is coupled to the back of a flat panel display monitor through mounting provisions of the mounting pattern of the back plate that cooperates with corresponding mounting provisions on the back of the monitor.

14. The monitor arm coupling unit according to claim 6, in which the base part is, with the first reversing axis, positioned eccentrically from the center point at a distance ½e, and in which the adjustment part is reversibly mounted in the base part between a first connected position in which the end part of the monitor arm coupling piece is aligned with the center point, and a second connected position in which the end part is spaced away from the center point with a distance e.

15. A method of assembling a monitor arm stand, wherein two monitor arms, each comprising a monitor coupling part having a back plate that is provided with mounting provisions arranged in a mounting pattern that in use cooperates with corresponding mounting provisions on the back of a flat panel display monitor, which back plate comprises a central portion and a peripheral edge spaced away therefrom, and a monitor arm coupling piece that is connected to the back plate via an adjustment mechanism, which adjustment mechanism is reversible relative to a first reversing axis that extends substantially transversely to the back plate, are coupled with their first monitor arm coupling pieces adjacently one above the other onto a post, and wherein an end part of each arm coupling piece comprises a second reversing axis that extends substantially transversely through an attachment coupling the monitor arm coupling piece to the adjustment mechanism to the back plate, and wherein the end part of each monitor arm coupling piece of each monitor arm is reversible relative to the second reversing axis and is adjustable via the adjustment mechanism about the first reversing axis between a first connected position in which the second reversing axis of the end part of each monitor arm coupling piece is located away from a peripheral edge portion of the back plate, and a second connected position in which the second reversing axis of the end part is located closer to that peripheral edge portion of the back plate, and wherein the end part of each monitor arm coupling piece is set in the second position, and wherein adjustment parts of the monitor arm coupling pieces of each monitor arm are facing away from each other, such that the back plates are at the same position relative to the longitudinal axis of the post, and wherein the second reversing axis is offset from and not the same axis as the first reversing axis.

16. A monitor arm stand, wherein two monitor arms are coupled with first monitor arm coupling pieces adjacently one above the other onto a post, and wherein each monitor arm on a free end is provided with a monitor arm coupling unit to carry a monitor, the monitor arm coupling units each comprising a monitor coupling part having a back plate that is provided with mounting provisions arranged in a mounting pattern that in use cooperates with corresponding mounting provisions on the back of a flat panel display monitor, which back plate comprises a central portion and a peripheral edge spaced away therefrom, and a further monitor arm coupling piece that is connected to the back plate via an adjustment mechanism, which adjustment mechanism is reversible relative to a first reversing axis that extends substantially transversely to the back plate, wherein an end part of each first monitor arm coupling piece comprises a second reversing axis that extends substantially transversely through an attachment coupling the monitor arm coupling piece to the adjustment mechanism to the back plate and in which an end part of the further monitor arm coupling piece is reversible relative to the second reversing axis and is adjustable via the adjustment mechanism about the first reversing axis between a first connected position in which the second reversing axis of the end part of the further monitor arm coupling piece is located away from a peripheral edge portion of the back plate, and a second connected position in which the second reversing axis of the end part is located closer to that peripheral edge portion of the back plate, the end part of the further monitor arm coupling piece being connected to a free end of a monitor arm, wherein the end parts of the further monitor arm coupling pieces are arranged to face away from each other so as to have the back plates at the same position relative to the longitudinal axis of the post, and wherein the second reversing axis is offset from and not the same axis as the first reversing axis.

17. The monitor arm stand of claim 16, wherein the total adjustment equals a height h of a first monitor arm coupling piece.

18. The monitor arm stand of claim 17, wherein the adjustment for each end part is e, and wherein a total adjustment 2e equals the height h of a first monitor arm coupling piece.

19. The monitor arm stand according to claim 16, wherein a bottom further monitor arm coupling piece is facing downward, and a top further monitor arm coupling piece is facing upward.

20. The monitor arm stand according to claim 16, wherein the end parts of the further monitor arm coupling pieces remain connected to the back plates during adjustment between the first connected position and the second connected position.

21. The monitor arm coupling unit of claim 1, in which the end part of the monitor arm coupling piece remains connected to the back plate during adjustment between the first connected position and the second connected position.

* * * * *